(12) United States Patent
Han

(10) Patent No.: US 7,882,521 B2
(45) Date of Patent: Feb. 1, 2011

(54) EPG PROVIDING APPARATUS WITH A CHANNEL TABLE AND METHOD THEREOF

(75) Inventor: Kuk-hyun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 11/779,079

(22) Filed: Jul. 17, 2007

(65) Prior Publication Data

US 2008/0082998 A1  Apr. 3, 2008

(30) Foreign Application Priority Data

Oct. 2, 2006   (KR) ...................... 10-2006-0097415
Mar. 8, 2007   (KR) ...................... 10-2007-0023195

(51) Int. Cl.
*G06F 3/00*   (2006.01)
*G06F 13/00*  (2006.01)
*H04N 5/445*  (2006.01)

(52) U.S. Cl. ............................. 725/39; 725/37; 725/38

(58) Field of Classification Search .............. 725/37–61
See application file for complete search history.

(56) References Cited

U.S. PATENT DOCUMENTS

| 5,815,145 | A  | * | 9/1998  | Matthews, III  | 725/41  |
| 6,437,836 | B1 |   | 8/2002  | Huang et al.   |         |
| 2005/0175324 | A1 | * | 8/2005  | Gravina et al. | 386/125 |
| 2005/0251800 | A1 | * | 11/2005 | Kurlander et al. | 717/174 |
| 2006/0294247 | A1 | * | 12/2006 | Hinckley et al. | 709/228 |

OTHER PUBLICATIONS

First Office Action issued in counterpart Chinese Application No. 200710140300.X dated Feb. 26, 2010.

\* cited by examiner

*Primary Examiner*—Scott Beliveau
*Assistant Examiner*—Jeremy Duffield
(74) *Attorney, Agent, or Firm*—Sughrue Mion, PLLC

(57) ABSTRACT

Provided are an Electronic Program Guide (EPG) providing apparatus and method. The EPG providing apparatus includes a receiver receiving EPG channel information from a broadcast receiver, a channel table showing entire broadcast channel information, and a display device displaying a screen of a channel corresponding to a current location of the display device on the channel table based on the received EPG channel information.

6 Claims, 11 Drawing Sheets

FRONT SCREEN OF
DISPLAY DEVICE

REAR SCREEN OF
DISPLAY DEVICE

EPG PROVIDING APPARATUS WITH A CHANNEL TABLE AND METHOD THEREOF

CROSS-REFERENCE TO RELATED PATENT APPLICATION

This application claims the benefit of Korean Patent Application No. 10-2006-0097415, filed on Oct. 2, 2006, and Korean Patent Application No. 10-2007-0023195, filed on Mar. 8, 2007, in the Korean Intellectual Property Office, the disclosures of which are incorporated herein in their entirety by reference.

BACKGROUND OF THE INVENTION

1. Field of the Invention

Apparatuses and methods consistent with the present invention relate to providing an Electronic Program Guide (EPG).

2. Description of the Related Art

In general, broadcast receivers provide broadcast programs via a plurality of channels. Thus, a service for allowing users to easily select a desired broadcast program from the plurality of channels has been suggested, and an EPG is one type of this service. That is, EPG information or EPG channel information is guide information of broadcast programs which can be received by broadcast receivers and provides the convenience of channel selection to users in this modern multi-channel era.

Related art analog televisions (TVs) have a knob for channel selection and a knob for volume control as a user interface. In addition, in order to determine which programs are being broadcast on a particular day, a broadcast guide of a newspaper is referred to. Although the two interfaces are considerably intuitive, they have some disadvantages. The channel selection and volume control knobs have a disadvantage in that a user must control the knobs right in front of a TV, and the broadcast guide of a newspaper is inconvenient because a user must always search a newspaper of that particular day. The development of TVs has resulted in the use of a remote control as a user interface for TV control, and the broadcast guide of a newspaper has been developed to be in the form of EPG channel information. Thus, most current Digital TVs (DTVs) use a remote control as a physical user interface, a Graphic User Interface (GUI) as a user interface for displaying information, and EPG information as broadcast information.

FIG. 1 illustrates a related art TV user interface.

In a related art TV 110, a remote control 120 is used as a user interface for physical control, and a user perceives EPG channel information on a user interface for displaying information. The EPG channel information is a type of application for displaying broadcast information transmitted from a broadcast station and is displayed on a screen. A user uses the remote control 120 to search an EPG display screen 130, and in order to give defined instructions such as a channel change or volume control, the user activates a desired operation by pushing a relevant key of the remote control 120.

If the user uses only the remote control 120, the user must search for and select a desired channel by directly changing channels using a channel UP/DOWN or preferred channel button. If the user can use the EPG channel information, the user can load the EPG display screen 130 and search for and select a desired channel by performing a search using arrow buttons of the remote control 120.

However, since related art remote controls and EPG channel information are not intuitive, beginners experience difficulty in the use of the related art remote controls and EPG channel information, and time is required for a user to become familiar with their use. In addition, since a physical controller, such as a remote control, is separated from a result screen, a user must concentrate on both the remote control and the screen, and thus it is difficult to perceive an entire broadcasting schedule at a glance.

In addition, when a channel search is performed using a channel UP/DOWN button, a channel switching time of hundreds of milliseconds (msec) are required, and thus a relatively long time is taken. Furthermore, even if the EPG channel information including a broadcast screen is used, a desired channel cannot be found quickly due to a channel switching time and a search time.

SUMMARY OF THE INVENTION

The present invention provides an EPG providing apparatus and method, whereby a user can easily and quickly select a desired channel.

According to an aspect of the present invention, there is provided an EPG providing apparatus comprising: a receiver receiving EPG channel information from a broadcast receiver; a channel table showing entire broadcast channel information; and a display device displaying a screen of a channel corresponding to a current location of the display device on the channel table based on the EPG channel information received by the receiver.

The display device may comprise a display unit displaying a screen of a channel corresponding to a current location on the channel table based on the EPG channel information received by the receiver; and a transmitter transmitting information on the channel of the screen displayed by the display unit to the broadcast receiver.

The transmitter may transmit information on a desired channel from among channels of screens displayed by the display unit to the broadcast receiver according to a user's selection so that the broadcast receiver displays the channel selected by the user.

The EPG channel information received by the receiver may comprise a current screen and EPG text information of each of a total plurality of channels.

According to another aspect of the present invention, there is provided an EPG providing apparatus comprising: a receiver receiving EPG channel information from a broadcast receiver; and a channel table, which is divided into a plurality of sections and displays the EPG channel information in each section.

The channel table may respectively display a current screen of a corresponding channel in each section.

The channel table may respectively display a number or program information of a corresponding channel in each section.

The EPG providing apparatus may further comprise a transmitter transmitting information on a channel selected based on the displayed channel table to the broadcast receiver so that the broadcast receiver displays the selected channel.

According to still another aspect of the present invention, there is provided an EPG providing method comprising: receiving EPG channel information from a broadcast receiver; displaying a screen of a channel corresponding to a current location of a display device on a channel table based on the EPG channel information; a user selecting a desired channel from among channels of the displayed screen; and transmitting information on the selected channel to the broadcast receiver.

According to still another aspect of the present invention, there is provided an EPG providing method comprising:

receiving EPG channel information from a broadcast receiver; dividing a channel table into a plurality of sections and respectively displaying a screen of a channel corresponding to each section based on the EPG channel information; a user selecting a desired channel from among channels of the displayed screen; and transmitting information on the selected channel to the broadcast receiver.

According to still another aspect of the present invention, there is provided a computer readable recording medium storing a computer readable program for executing an EPG providing method comprising: receiving EPG channel information from a broadcast receiver; displaying a screen of a channel corresponding to a current location of a display device on a channel table based on the EPG channel information; a user selecting a desired channel from among channels of the displayed screen; and transmitting information on the selected channel to the broadcast receiver.

According to still another aspect of the present invention, there is provided a computer readable recording medium storing a computer readable program for executing an EPG providing method comprising: receiving EPG channel information from a broadcast receiver; dividing a channel table into a plurality of sections and respectively displaying a screen of a channel corresponding to each section based on the EPG channel information; a user selecting a desired channel from among channels of the displayed screen; and transmitting information on the selected channel to the broadcast receiver.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

The present invention will be described in detail by explaining exemplary embodiments of the invention with reference to the attached drawings.

Figure 1:
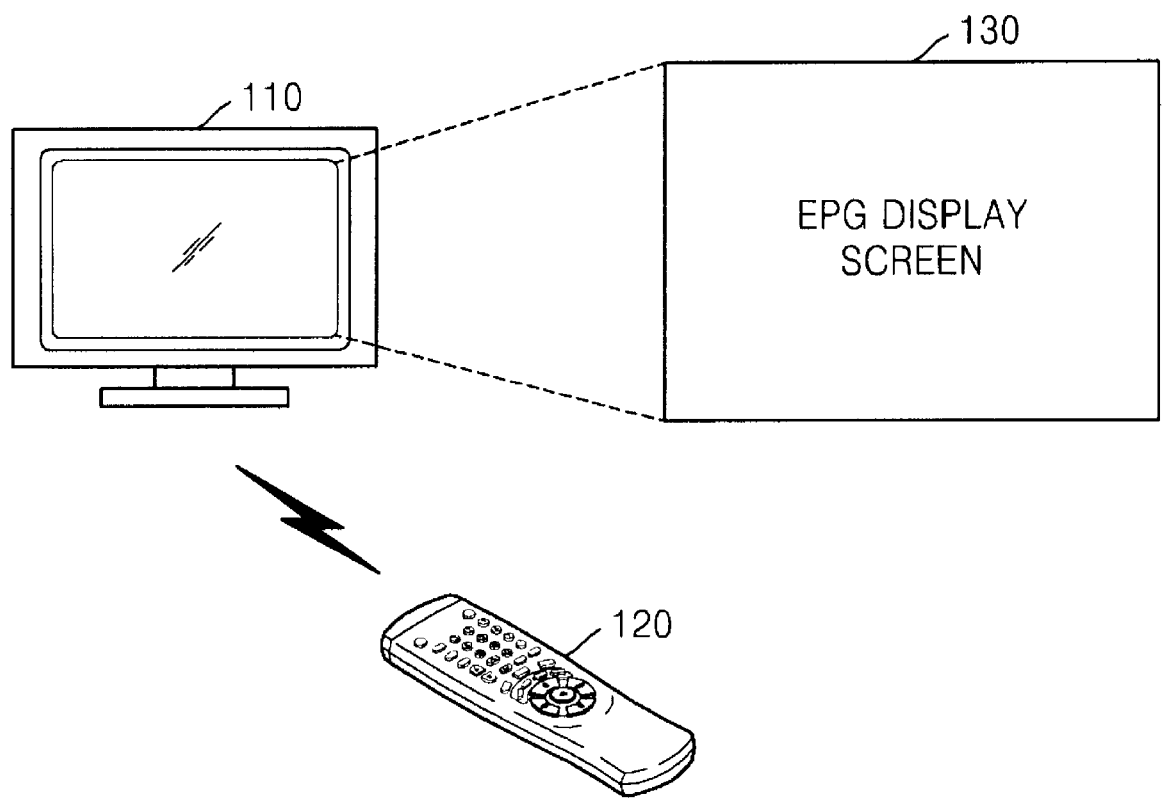
FIG. 1 illustrates a related art TV user interface.
Figure 2:
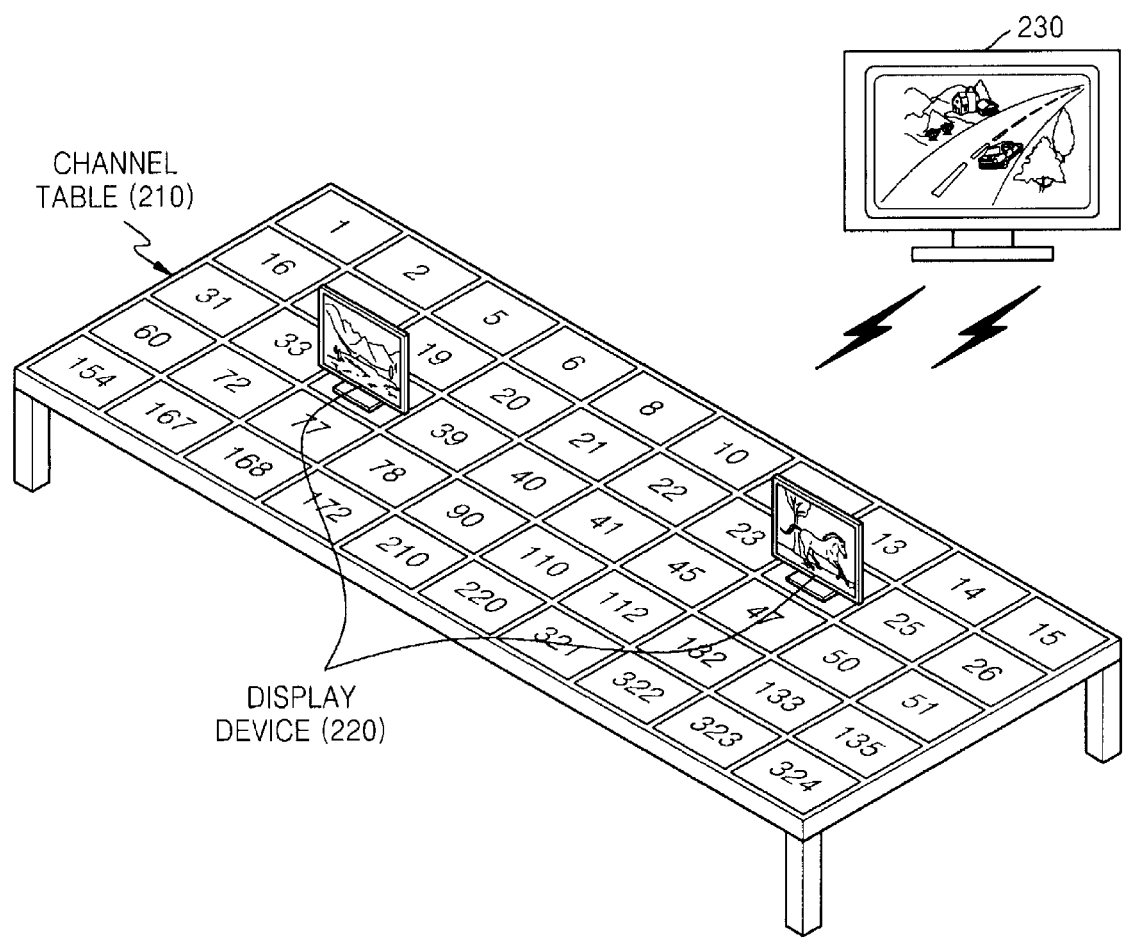
FIG. 2 is a schematic diagram of an EPG providing apparatus according to an exemplary embodiment of the present invention.

FIG. 2 is a schematic diagram of an EPG providing apparatus according to an exemplary embodiment of the present invention.

Referring to FIG. 2, the EPG providing apparatus includes a channel table 210 and a display device 220.

A receiver (not shown) of the EPG providing apparatus receives EPG channel information from a broadcast receiver 230 such as a TV set. The EPG channel information includes an EPG channel screen and channel text information. A user can move the display device 220 on the channel table 210 located in front of the user. In this case, the channel table 210 may be a table type or a sheet of paper on which a channel diagram is drawn.

The channel table 210 is divided into a plurality of sections corresponding to the total number of channels and a channel number is recorded on each section so that the user can see the all of the channels on the channel table 210 at a glance. If the user puts the display device 220 on a section of a channel to be checked by moving the display device 220 onto the section of the channel table 210, a current broadcast screen of the channel to be checked is displayed on the display device 220.

The channel table 210 can be connected to the receiver of the EPG providing apparatus or the broadcast receiver 230 in a wired or wireless manner. The channel table 210 can be configured to receive screen information corresponding to a currently selected channel from the connected receiver or broadcast receiver 230 and to transmit the screen information to the display device 220.

Alternatively, the channel table 210 may only have a function of providing a channel diagram to the display device 220. For example, when only a channel diagram is drawn on a sheet of paper, the channel table 210 may provide only the channel diagram, and the display device 220 may directly communicate with the broadcast receiver 230 or receive a screen of a current channel from the receiver of the EPG providing apparatus. Alternatively, the channel table 210 can provide the channel diagram and directly provide all screens that would otherwise be displayed on the display device 220 without using the display device 220. In this case, the broadcast contents of each channel can be displayed in real-time by means of another selection member, such as a touch screen of the channel table 210, instead of moving the display device 220. The channel table 210 may simultaneously display screens of all the channels.

If the user moves the display device 220 on the channel table 210, a displayed screen of a channel is changed according to the movement of the display device 220. That is, by only moving the display device 220 without performing channel up/down or an EPG channel information search, the user can view the broadcast contents of each channel in real-time. In addition, since a plurality of display devices 220 can be used at the same time, a plurality of users may view a broadcast screen of a desired channel at the same time.

If the user selects a desired channel while viewing each channel screen, a remote control signal corresponding to the selected channel is transmitted to the broadcast receiver 230. By receiving the remote control signal, the broadcast receiver 230 can switch a channel of the broadcast receiver 230 to the channel selected by the user.

An EPG providing apparatus according to another exemplary embodiment of the present invention includes a receiver and a channel table 210. The receiver receives EPG channel information from a broadcast receiver 230, and the channel table 210 displays an EPG information screen based on the EPG channel information. The channel table can display not only channel numbers but also channel screens or channel information. In addition, the channel table 210 can be represented by various map patterns or represented as a table or image using information which can be obtained from the EPG channel information.

Figure 3:
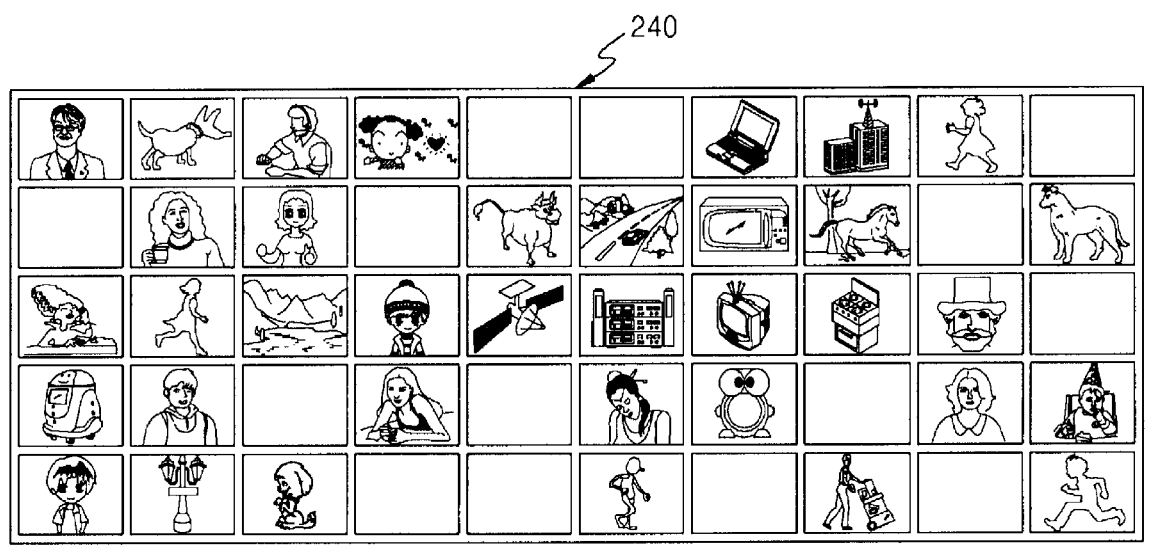
FIG. 3 illustrates an EPG-exclusive channel screen of a broadcast receiver according to an exemplary embodiment of the present invention.

FIG. 3 illustrates an EPG-exclusive channel screen 240 of a broadcast receiver 230 according to an exemplary embodiment of the present invention.

Recently, in the case of some cable TV providers, content of all channels can be transmitted as a table type on one channel. That is, all broadcast channels are shown on a single broadcast screen in a small matrix pattern. For example, if screens of all channels are arranged with a size of 160×120 on a High Definition (HD) channel (1920×1080), content of a total of 108 channels can be shown on a single screen. If a screen of each channel is updated at a speed of 15 frames per second (fps), content of a total of 216 channels can be shown at 15 fps.

An EPG-exclusive channel is a channel for transmitting a screen image including previews of all channels. For example, if a channel 3 is for Munhwa Broadcasting Corporation (MBC), a channel 4 is for Korean Broadcasting System (KBS), a channel 5 is for Seoul Broadcasting System (SBS), a channel 6 is for Education Broadcasting System (EBS), and so on, a channel 999 can be a channel for transmitting a screen image including previews of all channels such as MBC, KBS, SBS, EBS, and so on.

The broadcast receiver 230 receives the EPG-exclusive channel transmitted from a broadcast station and transmits the EPG-exclusive channel to the receiver of the EPG providing apparatus according to an exemplary embodiment of the present invention. The channel table 210 of the EPG providing apparatus can include all channel numbers or a portion of the channel numbers, which are contained in the EPG-exclusive channel received from the broadcast receiver 230, and the display device 220 calculates coordinates on the EPG-exclusive channel screen 240 and displays only a channel screen corresponding to a location of the display device 220 on the channel table 210.

Figure 4A:
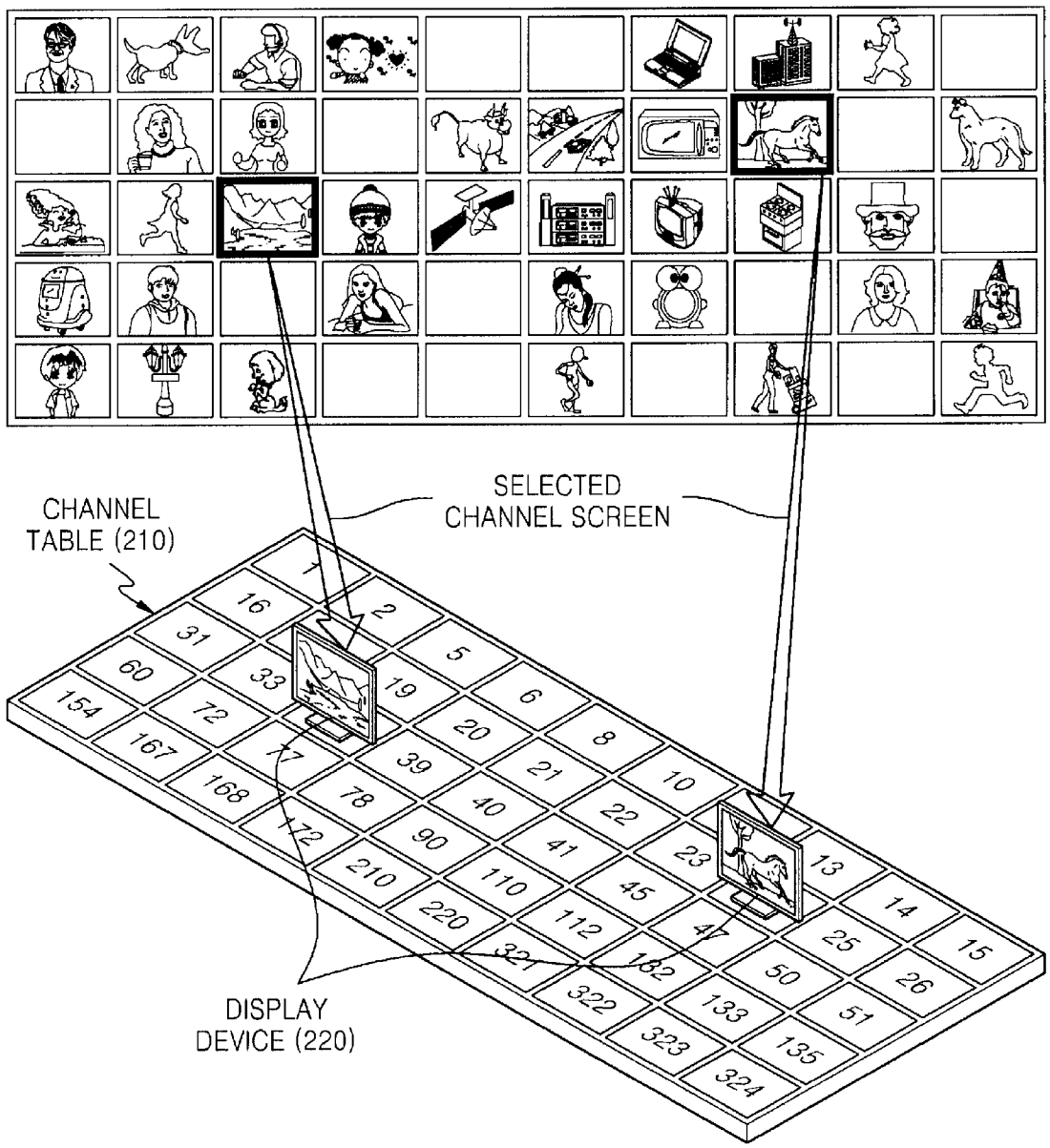
FIG. 4A illustrates a correlation between an EPG providing apparatus and an EPG-exclusive channel screen that is broadcast from a broadcast station according to an exemplary embodiment of the present invention.

FIG. 4A illustrates a correlation between an EPG providing apparatus and an EPG-exclusive channel screen 240 that is broadcast from a broadcast station according to an exemplary embodiment of the present invention.

When an EPG-exclusive channel transmitted from a broadcast station is received via a tuner of a broadcast receiver 230 or a separate tuner, it is displayed on the EPG-exclusive channel screen 240. A user can display, on the display device 220, a screen of a channel corresponding to a location of the display device 220 among the channels previewed by the EPG-exclusive channel screen 240 by moving the display device 220 on the channel table 210. In order to do this, a recognition unit for sensing on which channel the display device 220 is currently located is required. For the sensing, various recognition techniques, such as a Radio Frequency Identification RFID) tag, a barcode, or an exclusive mark, can be applied.

A screen of a channel selected by the user by moving the display device 220 is displayed on the display device 220. In this case, the user can select the channel displayed on the screen of the display device 220, which is desired to be displayed by the broadcast receiver 230 and can transmit a signal of the channel to the broadcast receiver 230.

Figure 4B:
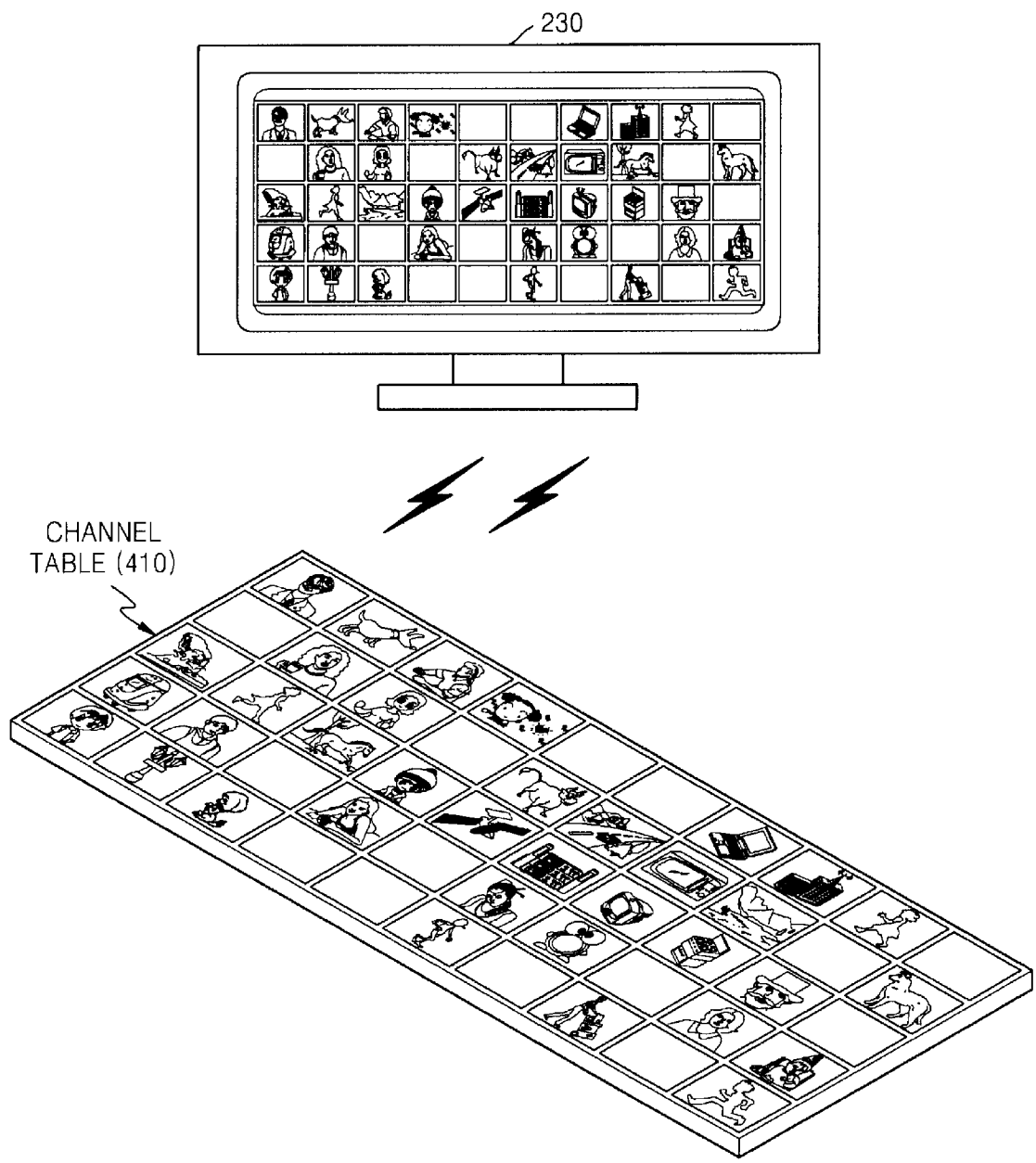
FIG. 4B is a schematic diagram of an EPG providing apparatus according to another exemplary embodiment of the present invention.

FIG. 4B is a schematic diagram of an EPG providing apparatus according to another exemplary embodiment of the present invention.

The EPG providing apparatus according to an exemplary embodiment includes a receiver (not shown) and a channel table 410. The receiver receives EPG channel information from a broadcast receiver 230, and the channel table 410 displays an EPG information screen based on the EPG channel information. As illustrated in FIG. 4B, the EPG-exclusive channel screen 240 illustrated in FIG. 3 can be displayed on the channel table 410. The channel table 410 can display channel information instead of the EPG-exclusive channel screen 240. In addition, the channel table 410 can be represented by various channel map patterns or represented as a table or image type using information which can be obtained from related art EPG channel information. The receiver receiving the EPG channel information may be a separate device from the channel table 410 or be an integral part of the channel table 410.

Figure 5A:
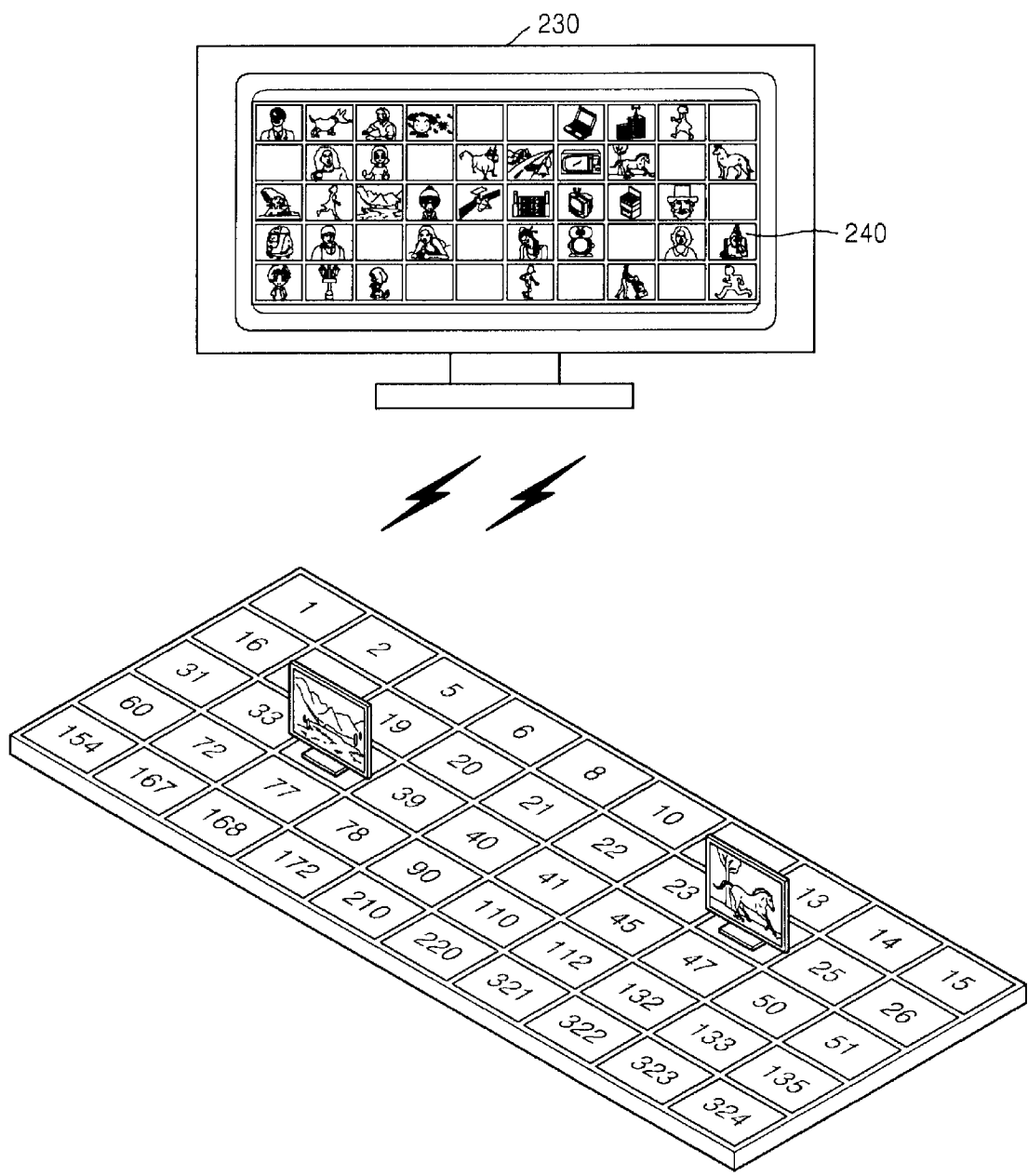
FIG. 5A illustrates a case where a TV has only one tuner.

FIG. 5A illustrates a case where a broadcast receiver 230, for example a TV, has only one tuner.

When the broadcast receiver 230, i.e. the TV, has only one tuner, since the TV must tune the EPG-exclusive channel, the EPG-exclusive channel screen 240 is also displayed on a TV screen at the same time.

Figure 5B:
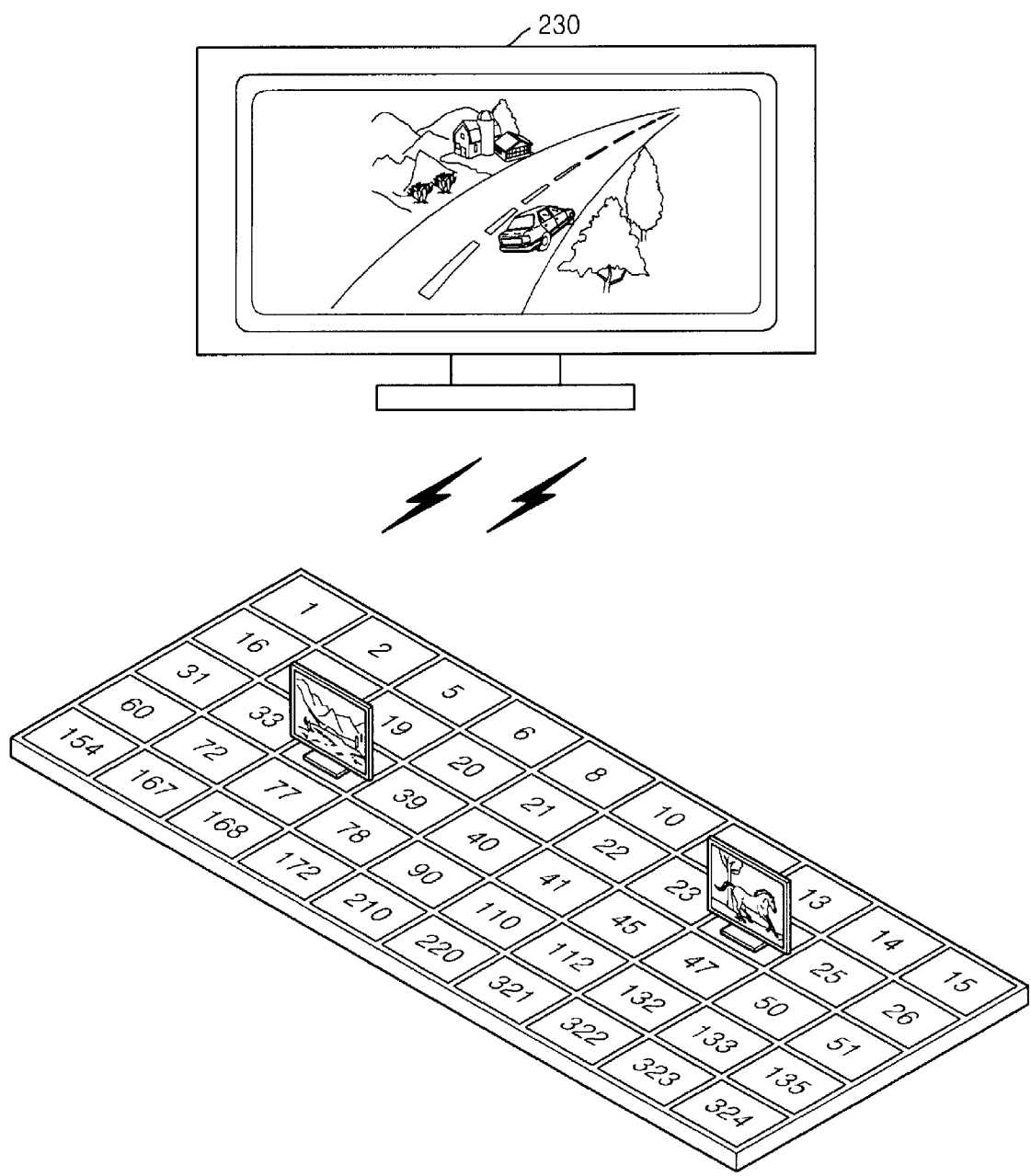
FIG. 5B illustrates a case where a TV has two or more tuners.

FIG. 5B illustrates a case where a broadcast receiver 230, for example a TV, has two or more tuners.

When the broadcast receiver 230, i.e. the TV, has two tuners, a desired channel can be viewed by means of the TV using a tuner excluding a tuner for tuning the EPG-exclusive channel. However, the user cannot view more than two channels at the same time using Picture in Picture (PIP). The number of display devices 220 which can be simultaneously used on the channel table 210 is independent of the number of tuners and can be used without limitation.

Figure 6A:
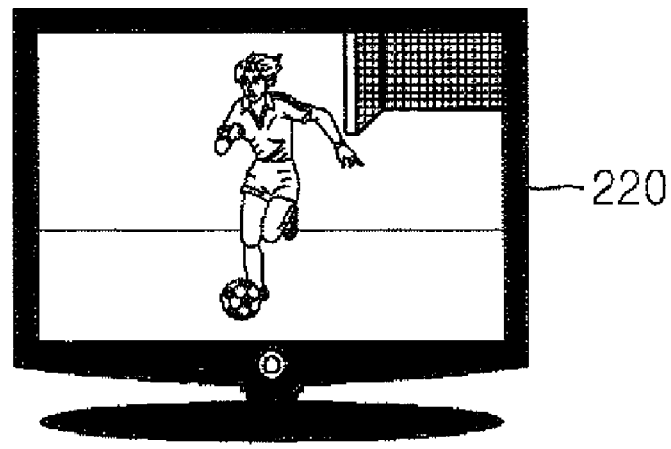
FIG. 6A illustrates a front screen of a display device of an EPG providing apparatus according to an exemplary embodiment of the present invention.

FIG. 6A illustrates a front screen of a display device 220 of an EPG providing apparatus according to an exemplary embodiment of the present invention.

The display device 220 can be implemented with one screen on either side, and FIG. 6A shows a front screen of the display device 220 implemented with two screens. In the front screen, a current broadcast screen of a channel corresponding to the location of the display device 220 on the channel table 210 is viewed. The user can select a desired channel while viewing broadcast content displayed on the display device 220.

Figure 6B:
FIG. 6B illustrates a rear screen of a display device of an EPG providing apparatus according to an exemplary embodiment of the present invention.

FIG. 6B illustrates a rear screen of a display device 220 of an EPG providing apparatus according to an exemplary embodiment of the present invention.

When the display device 220 is implemented with one screen on either side, EPG text information can be provided through a rear screen of the display device 220. The EPG text information can include simple description information, such as a current channel number and name, a title and a period of time that a currently broadcast program is shown, the plot of the program, and so on.

When the display device 220 is implemented using a single screen, the display device 220 can have a toggle button so that the user can view both screens by pushing the toggle button to switch between a broadcast screen and an EPG text information screen.

Figure 7:
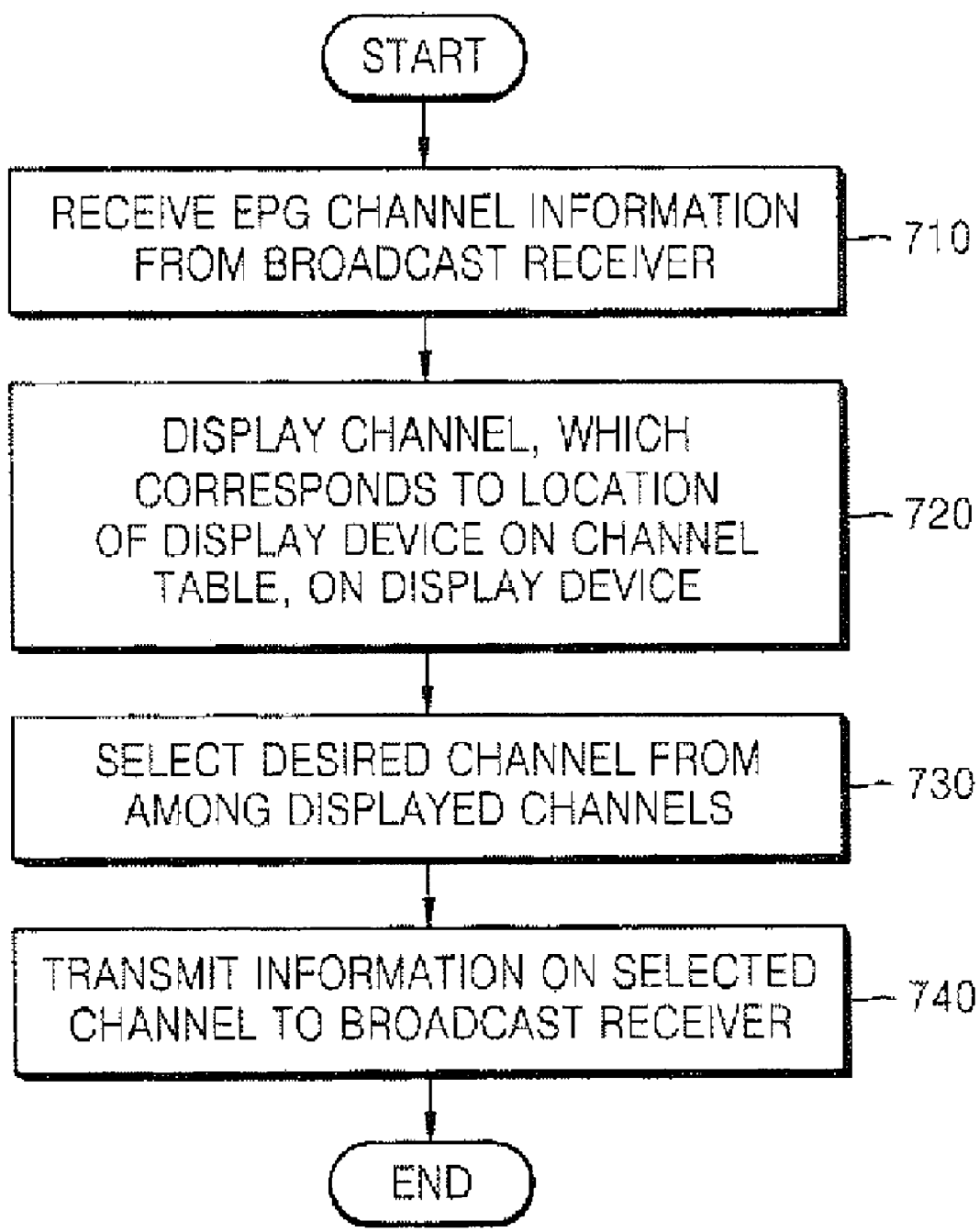
FIG. 7 is a flowchart of an EPG providing method according to an exemplary embodiment of the present invention.

FIG. 7 is a flowchart of an EPG providing method according to an exemplary embodiment of the present invention.

Referring to FIG. 7, EPG channel information is received from a broadcast receiver 230, such as a TV, in operation 710. In order to do this, the broadcast receiver 230 must receive the EPG channel information from a broadcast station in advance. The EPG channel information may include broadcast content, EPG text information, and an EPG-exclusive channel. A receiver receiving the EPG channel information may be included in a small display device 220 or a channel table 210, or included in an EPG providing apparatus separate from the small display device 220 or the channel table 210.

A channel corresponding to the current location of the display device 220 on the channel table 210 is displayed on the display device 220 in operation 720. A user can move the display device 220 on the channel table 210. In order for the user to see all channels on the channel table 210 at a glance, the channel table 210 is divided into sections corresponding to the number of channels, each section having a channel number. A channel corresponding to the current location of the display device 220 on the channel table 210 is sensed, and the sensed channel is displayed on the screen of the display device 220. In order to sense which channel the location of the display device 220 corresponds to, various recognition techniques can be used, such as an RFID tag, a barcode, and an exclusive mark. If the user moves the display device 220, a screen of a channel corresponding to the new location is displayed. A plurality of display devices 220 can be simultaneously used, and in this case, a plurality of users can search for a channel on the single channel table 210.

The user selects a desired channel from among channels displayed on the display device 220 in operation 730. For example, a 'select' button is defined in the display device 220, wherein the user can select a desired channel by pushing the 'select' button.

Information on the channel selected by the user is transmitted to the broadcast receiver 230 in operation 740. If the user selects a desired channel, a remote control signal of the channel selected by the user is transmitted to the broadcast receiver 230. When the broadcast receiver 230 receives the remote control signal, a channel screen of the broadcast receiver 230 is switched to a current screen of the channel selected by the user.

Figure 8:
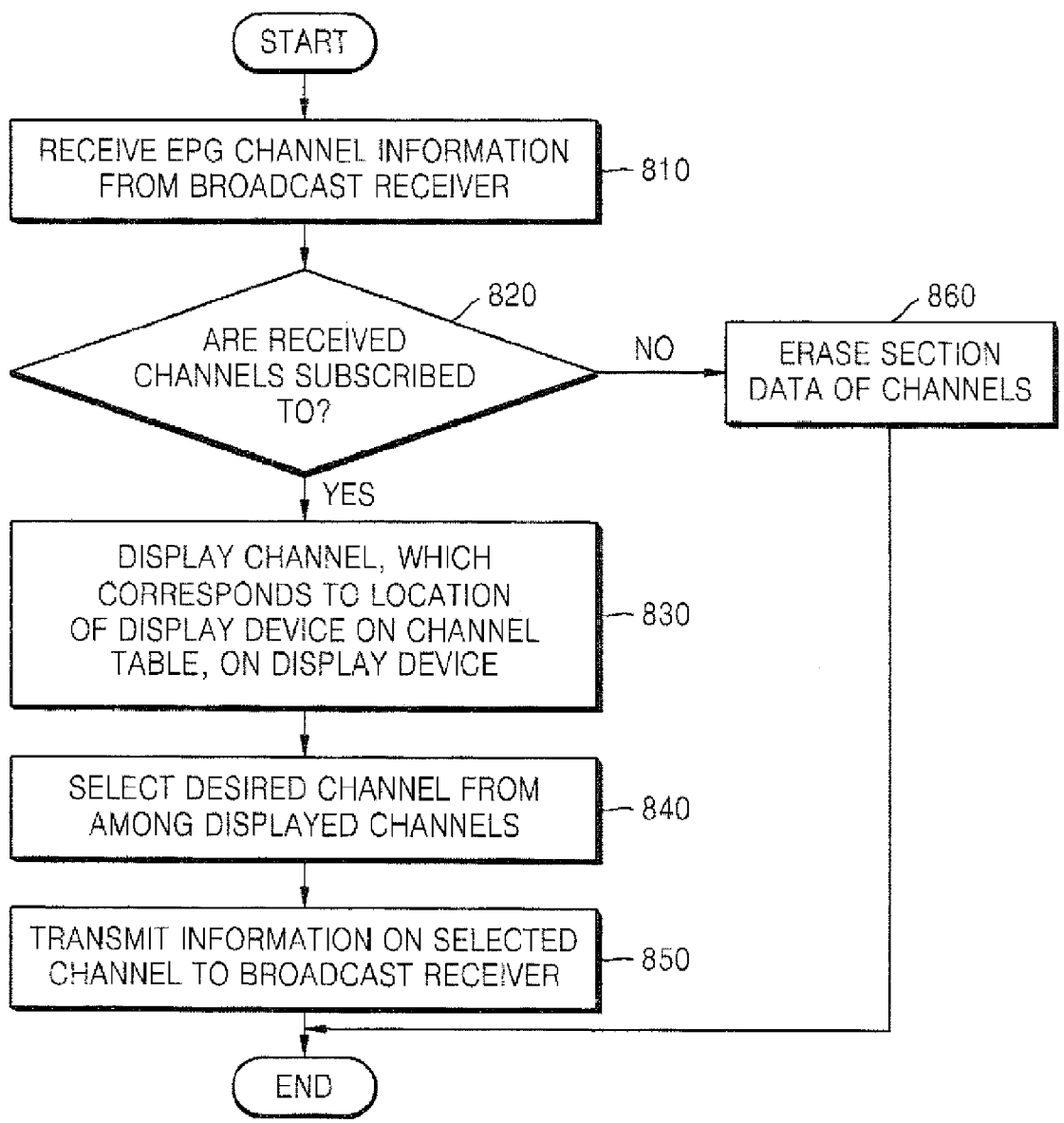
FIG. 8 is a flowchart of an EPG providing method according to another exemplary embodiment of the present invention.

FIG. 8 is a flowchart of an EPG providing method according to another exemplary embodiment of the present invention.

Referring to FIG. 8, EPG channel information is received from a broadcast receiver 230 in operation 810.

It is determined in operation 820 whether channels received from the broadcast receiver 230 are subscribed to by a user. If the broadcast receiver 230 limits viewing using Point of Deployment (POD), an EPG screen only for channels subscribed to by the user must be allowed. POD is a chip having subscriber information, such as a receive limitation system of POD broadcasting, wherein a POD module limits viewing of a channel if the channel is not subscribed to by the user.

This is to provide only information on available channels to the user by blocking information on unavailable channels in an EPG providing apparatus even though a broadcast station may transmit individual EPG broadcast channels according to subscribers' levels.

If it is determined in operation 820 that the received channels are subscribed to by the users a channel corresponding to a location of the display device 220 on the channel table 210 is displayed on the display device 220 in operation 830. For example, if the display device 220 is located on the channel table 210 so as to correspond to a non-subscribed channel, the channel is not displayed.

The user selects a desired channel from among displayed channels in operation 840. Information on the channel selected by the user is transmitted to the broadcast receiver 230 in operation 850 so that the broadcast receiver 230 switches from a current channel screen to a current screen of the channel selected by the user.

If it is determined in operation 820 that channels, which are not subscribed to by the user, exist in the EPG channel information received from the broadcast receiver 230, section data of the channels is erased in operation 860. After the channel section data is erased, even if the user moves the display device 220 onto a location corresponding to an erased channel on the channel table 210, a screen of the erased channel cannot be displayed.

Figure 9:
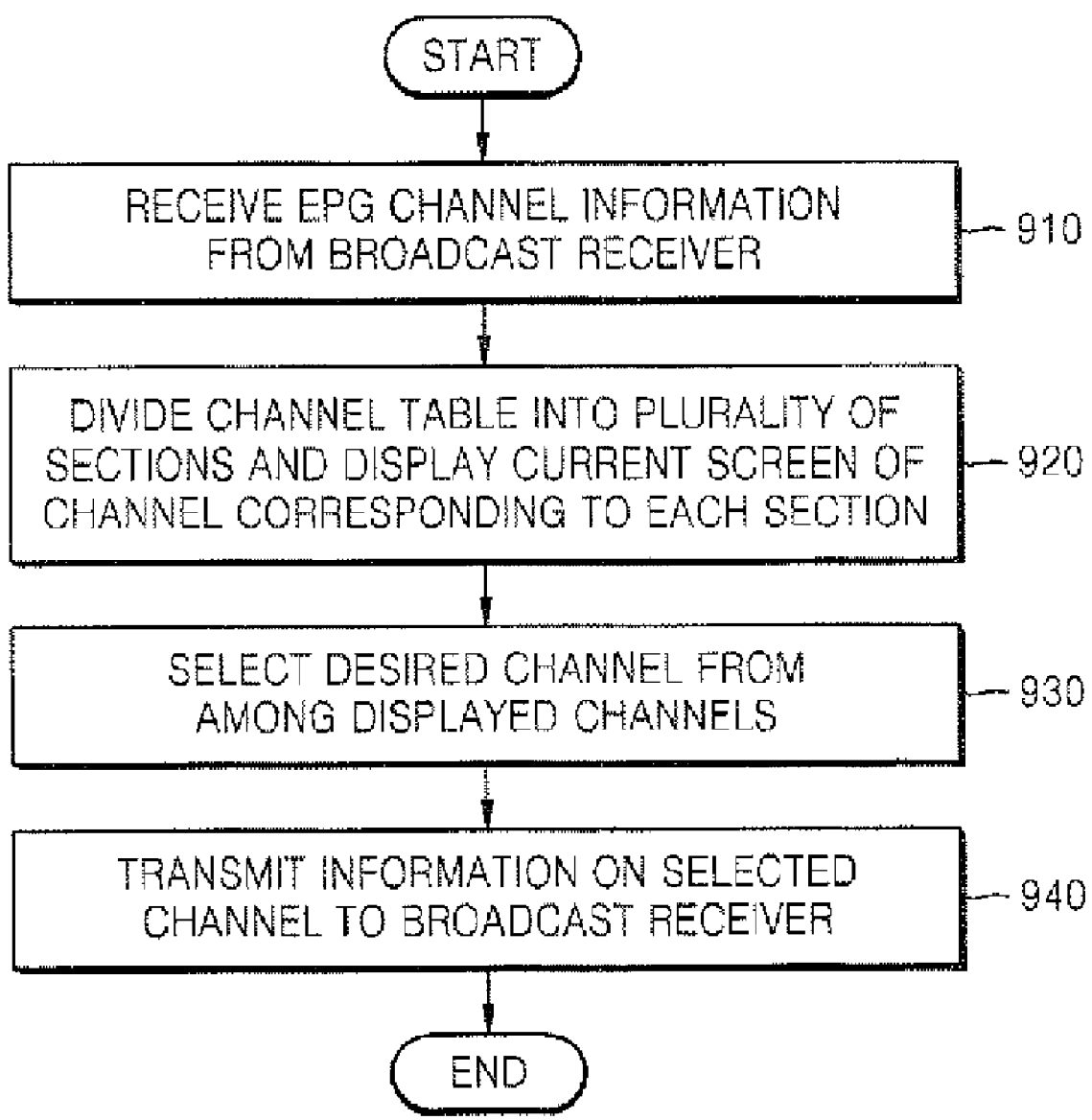
FIG. 9 is a flowchart of an EPG providing method according to another exemplary embodiment of the present invention.

FIG. 9 is a flowchart of an EPG providing method according to another exemplary embodiment of the present invention.

Referring to FIG. 9, EPG channel information is received from a broadcast receiver 230 in operation 910. The EPG channel information may include broadcast content, EPG text information, and an EPG-exclusive channel A receiver receiving the EPG channel information may be included in the channel table 410.

The channel table 410 is divided into a plurality of sections, and a current screen of a channel corresponding to each section is displayed in operation 920. The channel table 410 can display the GPS-exclusive channel screen 240 illustrated in FIG. 3 or display only a screen selected by the user. The channel table 410 can display channels or content of the channels by using a table or image pattern and provide various pieces of EPG channel information, such as a description of programs.

The user selects a desired channel from among the displayed channels in operation 930. The user can select a desired channel while viewing the screen displayed on the channel table 410.

Information on the channel selected by the user is transmitted to the broadcast receiver 230 in operation 940. When the broadcast receiver 230 receives the information, a channel screen of the broadcast receiver 230 is switched to a current screen of the channel selected by the user.

The EPG channel information is a kind of guide information of broadcast programs that are receivable in a broadcast receiver, and although the EPG providing apparatus and method has been described according to an exemplary embodiment of the present invention, the present invention is not limited to the EPG channel information but can be applied to any apparatus and method for providing broadcast programs.

The exemplary embodiments of the present invention can be written as computer programs and can be implemented in general-use digital computers that execute the programs using a computer readable recording medium. Examples of the computer readable recording medium include magnetic storage media (e.g., read-only memory (ROM), floppy disks, hard disks, etc.), and optical recording media (e.g., compact disc (CD)-ROMs, or digital versatile discs (DVDs)).

As described above, according to the exemplary embodiments of the present invention, by providing an EPG providing apparatus for searching for a channel by moving a display device on a channel table, a user does not have to learn how to select a channel and can search for a channel while viewing a screen of the display device without viewing a screen of a TV, and thus, it is simple and convenient.

In addition, since an EPG-exclusive channel screen is a screen which has already been tuned by a tuner, only the time for enlarging a screen of a desired portion is required, and thus, a desired channel can be quickly searched for.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore the scope of the invention is defined not by the detailed description of exemplary embodiments of the invention but by the appended claims, and all differences within the scope will be construed as being included in the present invention.

What is claimed is:

1. An Electronic Program Guide (EPG) providing apparatus comprising:
    a receiver which receives EPG channel information from a broadcast receiver;
    a channel table which displays broadcast channel information; and
    a display device which displays a screen of a channel corresponding to a current location of the display device on the channel table based on the received EPG channel information.

2. The EPG providing apparatus of claim 1, wherein the display device comprises:
    a display unit which displays the screen of the channel corresponding to the current location; and
    a transmitter which transmits information on the channel of the screen displayed by the display unit to the broadcast receiver.

3. The EPG providing apparatus of claim 2, wherein the transmitter transmits information on a desired channel selected by a user from among channels of screens displayed by the display unit to the broadcast receiver, and the broadcast receiver displays a screen of the desired channel selected by the user.

4. The EPG providing apparatus of claim 1, wherein the received EPG channel information comprises a current screen and EPG text information of each of a plurality of channels.

5. An Electronic Program Guide (EPG) providing method comprising:
    receiving EPG channel information from a broadcast receiver;
    displaying a screen of a channel corresponding to a current location of a display device on a channel table based on the received EPG channel information;
    selecting a desired channel from among channels of the displayed screen; and
    transmitting information on the selected channel to the broadcast receiver.

6. A non-transitory computer readable recording medium storing a computer readable program for executing an Electronic Program Guide (EPG) providing method, the method comprising:
    receiving EPG channel information from a broadcast receiver;
    displaying a screen of a channel corresponding to a current location of a display device on a channel table based on the received EPG channel information;
    selecting a desired channel from among channels of the displayed screen; and
    transmitting information on the selected channel to the broadcast receiver.

* * * * *